(12) United States Patent
Cannet et al.

(10) Patent No.: US 7,807,259 B2
(45) Date of Patent: Oct. 5, 2010

(54) GAS VESSEL PACKING STRUCTURE HAVING A CRYSTALLINE PHASE

(75) Inventors: Gilles Cannet, Parmain (FR); Pascal Del-Gallo, Dourdan (FR); Thierry Chartier, Feytiat (FR); Emmanuel Baune, Oise (FR); Jérome Cantonnet, Brive (FR); Jean-François Imbault, Saint Clement (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 447 days.

(21) Appl. No.: 11/828,120

(22) Filed: Jul. 25, 2007

(65) Prior Publication Data
US 2008/0022697 A1 Jan. 31, 2008

(30) Foreign Application Priority Data
Jul. 26, 2006 (FR) .................................... 06 53119

(51) Int. Cl.
*B32B 13/02* (2006.01)
*B32B 13/10* (2006.01)
(52) U.S. Cl. ..................... 428/294.7; 428/703; 206/0.7; 502/407; 62/46.3
(58) Field of Classification Search ................ 428/34.1, 428/294.7, 703; 206/0.7; 502/407; 62/46.3
See application file for complete search history.

(56) References Cited

U.S. PATENT DOCUMENTS

| 3,454,362 | A | 7/1969 | Spry |
| 4,129,450 | A | 12/1978 | Flanigen et al. |
| 4,226,839 | A | 10/1980 | O'Neil et al. |
| 4,349,463 | A | 9/1982 | Flanigen |
| 4,349,643 | A | 9/1982 | Mohiudden |
| 4,895,825 | A | 1/1990 | Deck et al. |

FOREIGN PATENT DOCUMENTS

| EP | 0 262 031 | 3/1988 |
| EP | 0 264 550 | 4/1988 |
| WO | WO 93 16011 | 8/1993 |
| WO | WO 98 29682 | 7/1998 |

OTHER PUBLICATIONS

French Search Report for FR 0653119.
Turkdogan E.T., et al. "*Calcination of limestone*," Transactions of Society of Mining Engineers, SME; Littleton, CO, vol. 254, No. Mar. 1, 1973, pp. 9-21.
Boynton, R.S. "*Chemistry and technology of lime and limestone.*" 1980, Wiley, NY, pp. 164-179.
Eades J.L., et al. "*Characterization of the properties of commercial lime by surface area measurements and scanning electron microscopy.*" ASTM Special Technical Publication, Am. Soc. for Testing Materials, Philadelphia, PA, Jun. 1970, pp. 3-23.
Gebica M. "*Bedeutung verschiedener Einflussfactoren und Verfaren beim neuzeitlichen Kalkbrennen,*" Zement-Kalk-Gips, vol. 33, No. 10, Oct. 1980, pp. 508-514.

*Primary Examiner*—Michael C Miggins
(74) *Attorney, Agent, or Firm*—Donna Blalock Holguin

(57) ABSTRACT

The present invention relates to a container packing structure, characterized in that it comprises a crystalline phase containing 55 to 97% by weight of xonotlite crystallites and 3 to 45% by weight of tobermorite crystallites. It also relates to a method for fabricating such a packing structure, and the container containing same, and its use for storing fluids such as gases.

3 Claims, No Drawings

GAS VESSEL PACKING STRUCTURE HAVING A CRYSTALLINE PHASE

CROSS REFERENCE TO RELATED APPLICATIONS

This application claims the benefit of priority under 35 U.S.C. §119 (a) and (b) to French Application No. FR 0653119, filed Jul. 26, 2006, the entire contents of which are incorporated herein by reference.

BACKGROUND

The present invention relates to novel packing structures for containers, to the containers containing them, and to their use for storing fluids such as gases.

The use of pressurized containers containing gases, such as acetylene, dissolved in a solvent, such as acetone, is known in various medical and professional applications, and particularly for performing welding, brazing and heating operations in combination with an oxygen cylinder.

These containers are normally packed with solid filling materials, designed to stabilize the gases they contain, which are thermodynamically unstable under the effect of pressure or temperature variations and therefore liable to decompose during their storage, transport and/or delivery.

These materials must have sufficient porosity to facilitate the absorption and liberation of the gases present in the container. They must also be incombustible, inert to these gases, and have good mechanical strength. These materials commonly consist of porous silico-calcaneous ceramic masses, obtained for example from a homogenous mixture in water of quicklime or milk of lime and silica (particularly in the form of quartz flour), as described in documents WO 93/16011, WO 98/29682, EP 0 262 031, to form a slurry which is then subjected to hydrothermal synthesis. More precisely, the slurry is introduced into the container to be packed, under partial vacuum, the said container then being subjected to autoclaving at pressure and temperature, followed by firing in a furnace to completely remove the water and form a monolithic solid mass with the composition $Ca_xSi_yO_z.wH_2O$ having crystalline structures of the tobermorite and xonotlite type, with a possible residual presence of quartz. Various additives may be added to these prior art mixtures to improve the dispersion of the lime and silica and thereby avoid the formation of structural inhomogeneities and shrinkage effects observed during the hardening of the porous mass. The filling materials obtained must in fact have a uniform porosity without voids in which gas pockets could accumulate and incur explosion hazards.

Document EP 0 264 550 further indicates that a porous mass containing at least 50%, or at least 65%, or even at least 75% by weight of crystalline phase (compared to the weight of calcium silicate) serves to satisfy the dual requirement of compressive strength and resistance to shrinkage at the hydrothermal synthesis and firing temperatures.

However, it remains true that the properties of withdrawal of the gases trapped in the porous masses of the prior art are so far inadequate.

In fact, depending on the operating conditions (operating temperature, production rate, quantity of gas contained in the cylinder, . . . ), they do not always permit the continuous withdrawal of the gas they contain, at a high flow rate, throughout the time necessary for certain applications, in particular welding, with a maximum degree of gas recovery, corresponding to the ratio of the quantity of usable gas to the quantity of gas initially stored. In fact, it will be desirable to be able to guarantee a continuous flow rate of 200 l/h for at least 15 min and a peak flow rate of 400 l/h for at least 4 min, for a gas capacity equal to or higher than 50% at the start of the test (defined as the ratio of the quantity of gas present at this time to the quantity of gas initially loaded into the container), the container having a diameter/length ratio of between 0.2 and 0.7, preferably between 0.35 and 0.5, for a minimum water capacity of 1 liter and preferably of between 3 and 10 liters.

This inadequacy is due in particular to the heat losses associated with the extraction of the gas from the solvent, which may prove to be seriously detrimental to the withdrawal of the gas. In the case of an acetylene cylinder, for example, the energy consumption is about 600 joules per gram of acetylene extracted from the solvent. In practice, this leads to substantial cooling of the cylinder during withdrawal, causing a greater solubilization of the acetylene in the solvent and thereby a drop in pressure which affects the withdrawal rate. The flow is ultimately exhausted when the cylinder outlet pressure falls below the atmospheric pressure.

The abovementioned occurrence is particularly pronounced under certain low temperature conditions, for example in winter, or in cold regions, high production rate, long withdrawal time (in certain places, the final temperature of the cylinder possibly falling 40° C. below its initial temperature during prolonged withdrawal), container volume and quantity of gas stored.

Furthermore, the temperature and pressure variations are not uniform in the container, and this may lead to the appearance of mechanical stresses liable to cause degradation of the porous mass over time.

Thus, added to the withdrawal difficulties are problems of mechanical strength which may have repercussions on safety.

The present invention is suitable for overcoming these drawbacks of the prior art by using a packing structure of which the chemical composition gives it, in particular, thermal conductivity (λ), when it is loaded with solvent, enabling it to convey the negative heat flow when the gas is extracted from the solvent.

More precisely, the applicant has now demonstrated that these drawbacks of the prior art could be overcome by using a container packing structure in the form of crystalline phases present in particular proportions. The applicant has also developed the method for obtaining the said packing structure.

The present invention thus relates to a container packing structure, characterized in that it comprises a crystalline phase containing 55 to 97% by weight of xonotlite crystallites and 3 to 45% by weight of tobermorite crystallites.

Xonotlite is a calcium silicate, with the formula $Ca_6Si_6O_{17}(OH)_2$, which has repeat units consisting of three tetrahedra. Tobermorite is also a calcium silicate, with the formula $Ca_5Si_6(O,OH)_{18}.5H_2O$, crystallized in orthorhombic form.

In the packing structure of the invention, these two crystalline phases are in the form of acicular or needle-like crystallized arrangements. Preferably, at least 50% by volume of these needles have a length of 2 to 10 µm, and more preferably of 2 to 5 µm, and a thickness of 0.2 to 1 µm, and more preferably of 0.2 to 0.5 µm, compared to the total volume of the xonotlite and tobermorite needles in the packing structure. The remaining fraction of needles, representing less than 50% by volume of the material, preferably consists of needles having a length of between 0.5 to less than 2 µm and a thickness of between 0.01 to less than 0.2 µm.

Preferably, these needles are interconnected by "bridges" so that together they have a pore diameter D95 (diameter at which 95% by volume of the pores have a lower diameter)

greater than or equal to 0.4 μm and lower than 5 μm. Furthermore, the packing structure preferably has a mean pore diameter $D_{50}$ (diameter at which 50% by volume of the pores have a lower diameter) greater than or equal to 0.4 μm and lower than 1.5 μm. Finally, it advantageously has a total open porosity of between 80% and 90%. These values can all be measured by mercury porosimetry.

Preferably, the packing structure of the invention comprises at least 70% by weight, and more preferably at least 80% by weight, or even at least 90% by weight, of crystalline phase containing xonotlite and tobermorite crystallites. It may also optionally contain one or more intermediate phases based on Ca, Si, O and H, with the formula $Ca_xSi_yO_z.wH_2O$, such as foshagite, calcium carbonate and silica. The combination of these intermediate phases may account for a total of 0 to 15%, preferably 0 to 10% and more preferably 0 to 5% by weight of the crystalline phase present in the packing structure (including the xonotlite and tobermorite crystallites). Calcium carbonate and silica may each account for 0 to 5% of the total weight of these crystalline phases, the quantity thereof preferably being less than 3% by weight.

As it appears from the experimental part of this application, the use of a packing structure comprising xonotlite and tobermorite crystallites in the proportions indicated above serves to obtain the desired withdrawal rate while meeting the safety and mechanical strength requirements.

Apart from the crystalline phase described above, the packing structure of the invention may comprise fibres advantageously selected from synthetic fibres based on carbon, such as described in particular in document U.S. Pat. No. 3,454,362, alkali-resistant glass fibres, as described in particular in document U.S. Pat. No. 4,349,643, partially delignified cellulose fibres, as described in particular in document EP 0 262 031, and mixtures thereof, without this list being exhaustive. These fibres are useful in particular as reinforcing materials, to improve the impact strength of the packing structure, and also serve to avoid problems of cracking upon drying of the structure. These fibres can also be used as such or after treatment of their surface.

The packing structure may also include dispersants and/or binders, such as cellulose derivatives, particularly carboxymethylcellulose, hydroxypropylcellulose or ethylhydroxyethylcellulose, polyethers, such as polyethylene glycol, synthetic clays of the smectite type, amorphous silica with a specific surface area advantageously of between 150 and 300 $m^2/g$, and mixtures thereof, without this list being exhaustive.

Preferably, the packing structure contains fibres, particularly carbon fibres and/or glass fibres and/or cellulose fibres. The quantity of fibres is advantageously lower than 55% by weight, compared to the total solid precursors used in the method for fabricating the packing structure. It is preferably between 3 and 20% by weight.

The packing structure of the invention preferably has a compressive strength equal to or higher than 15 $kg/cm^2$, or 1.5 MPa, more preferably higher than 20 $kg/m^2$, or 2 MPa. The compressive strength can be measured by taking a 100×100 $mm^2$ cube from the packing structure and applying a pressure force to the upper face thereof, while it is held against a horizontal metal plate. This force corresponds to the pressure (in $kg/cm^2$ or MPa) above which the material begins to crack.

It also preferably has a thermal conductivity of about 0.04 to 0.10 W/m/K.

The present invention also relates to a method for fabricating the packing structure leading to the desired crystallization and comprising the successive steps consisting in:

calcining limestone blocks at a temperature of at least 850° C. for at least one hour, such that at least 90% by weight of the said blocks have dimensions of 1 to 15 mm, the said limestone having a purity of at least 92% by weight and an open porosity of between 0 and 25%, to obtain quicklime particles, mixing the said particles, in aqueous medium with silica and optionally with other compounds, to obtain a slurry, subjecting the said slurry to hydrothermal synthesis at a temperature of between 170 and 300° C., to obtain a ceramic mass, and drying the said ceramic mass at a temperature of 300 to 450° C. for a period of 40 to 200 hours.

In the context of the present invention, "purity" means the percentage by weight of calcium carbonate in the limestone.

It is clearly understood that this method may comprise steps other than those mentioned above, which may be preliminary, intermediate or additional steps thereto.

The inventive method uses, in its first step, limestone blocks measuring 0.1 to 15 mm and preferably 1 to 12 mm. It has been determined that these values made it possible to calcine them right to the core under relatively simple conditions and, after calcination, to obtain a lime particle size distribution of between 0.1 and 15 mm, thereby guaranteeing it good reactivity in the implementation of the second step of the method (measured according to standard NF EN 459-2), without an excessive risk of hydration and/or carbonation that could result from the method for storing the lime after calcination and which, ultimately, could affect the quality of the packing structure. These blocks may be obtained by crushing larger limestone blocks and subsequent screening. It has a purity ($CaCO_3$ content with regard to the total weight of the limestone) of at least 92% by weight and preferably at least 95% by weight, or even at least 97% by weight, which limits the presence of impurities liable to affect the hydrothermal synthesis from the precursors of the crystalline structures described above. The limestone used according to the inventive method thus preferably contains less than 6% by weight of magnesium carbonate and silica and less than 1% by weight of alumina, iron oxide, manganese oxide, other oxides, particularly of potassium, sodium, titanium, and impurities such as sulphur or phosphorus. Finally, the open porosity of the limestone, measured by mercury porosimetry, is between 0 and 25% and is preferably between 5 and 25%, in order both to enable the water to adequately impregnate the lime that will be formed (to slake it) and to enable the carbon dioxide to escape during the formation of the lime by calcination of the limestone.

A person skilled in the art can identify the quarries or seams quarried for obtaining the abovementioned limestone blocks.

The temperature, time, and atmosphere conditions employed in this step further serve to totally calcine the limestone without causing sintering (densification) of the elementary particles, that would have the effect of closing the pores and thereby reducing the reactivity of the lime obtained. It has been observed in particular that, for hold times of two hours, the temperature should not be lower than 800° C. or higher than 1100° C. Furthermore, in the case in which the calcination temperature is set at 1100° C., the hold time must not be substantially longer than one hour. It is therefore clear that a person skilled in the art can adjust the temperature and time of limestone firing to a certain extent, provided that the temperature is higher than 850° C. for at least one hour. An adjustment may in fact be necessary according to the particular type of furnace, the quantity of limestone treated and the arrangement (such as thickness of layers) of the product in the furnace. A temperature of about 900° C. for about three hours is preferred. At this temperature, in fact, it has been observed that the rate of sintering was relatively slow and that the hold time had very little impact on the reactivity. Firing at this temperature therefore serves to adjust the calcination time to industrial requirements.

The first step of the inventive method thereby serves to obtain a quicklime having a satisfactory reactivity and, after hydrothermal synthesis, able to form the desired crystalline phase. Preferably, the quicklime obtained has a total water and carbon dioxide content of less than 2% by weight.

In the second step of the inventive method, the quicklime obtained on completion of the first step is mixed with silica. This may be amorphous or crystalline silica and is preferably such that its purity is at least 90% ($SiO_2$ weight content) and that it contains at least 90% by weight of elementary particles smaller than 1 µm, so that its reactivity with lime is the highest possible. Silicas of this type are commonly available on the market.

The lime and silica are preferably mixed with each other in a $CaO:SiO_2$ molar ratio of 0.8 to 1. Furthermore, the water/solid precursors (lime+silica+optionally fibres) ratio is preferably between 2 and 60, more preferably between 3 and 25.

It may furthermore be useful to add a dispersant to the mixture to improve its homogeneity. A lubricant such as a poly(oxyethylene) may also be provided.

The third step of the inventive method consists in subjecting the mixture (or "slurry") resulting from the second step to hydrothermal synthesis at a temperature of between about 170 and 300° C., preferably between 180 and 250° C., for a period ranging, according to the volume of the container to be packed, between 10 h and 70 h, for example close to 40 or 50 hours for a container with a water volume of 6 liters. According to a first embodiment, the synthesis can be carried out by introducing the slurry into the open container which it is intended to pack, and then placing the said container in an autoclave under a pressure of between $5 \times 10^5$ Pa and $25 \times 10^5$ Pa (5 and 25 bar), preferably between $7 \times 10^5$ Pa and $15 \times 10^5$ Pa (7 and 15 bar). According to a second embodiment, the hydrothermal synthesis can be carried out by placing the slurry in the container which it is intended to pack, by closing the said container with a plug equipped with a pressure control system (such as a valve), pressurizing the container to a pressure of between atmospheric pressure and $25 \times 10^5$ Pa (25 bar), preferably between $7 \times 10^5$ Pa and $15 \times 10^5$ Pa (7 and 15 bar), and then placing this container in an unpressurized furnace.

The fourth step of the method or drying step has the function of not only removing the residual water, but also giving the treated mass a mainly crystalline structure. This operation is carried out in a conventional electric furnace (which may or may not be the same as the one used for the hydrothermal synthesis), at atmospheric pressure, that is, after the plugs and valves have been removed from the top of the containers in the second example of hydrothermal synthesis described above.

A further object of the invention is the use of a packing structure as described above, to store fluids such as gases.

A further subject of the invention is a container containing a packing structure as described above, the said container being suitable for containing and distributing a fluid.

This container normally comprises a metal envelope enclosing the packing structure described above. The metal envelope may consist of a metallic material such as steel, for example a standardized P265NB carbon steel according to standard NF EN10120, whereof the thickness makes it capable of withstanding at least the hydrothermal synthesis pressure without risk of accident, and capable of withstanding a proof pressure of 60 bar (6 MPa), a regulation standard value for packaging acetylene in the conditions described above. The container is further normally cylindrical in shape and generally provided with closure means and a pressure controller. The said container preferably has a diameter/length ratio of between 0.2 and 0.7, more preferably between 0.35 and 0.5, and a minimum water capacity of one liter. The container is normally in the form of a cylinder.

The fluids stored in the packing structure of the invention may be gases or liquids.

As gases, mention can be made of compressed gases, pure or in mixtures in gaseous or liquid form, such as hydrogen, gaseous hydrocarbons (alkanes, alkynes, alkenes), nitrogen and acetylene, and gases dissolved in a solvent such as acetylene and acetylene-ethylene or acetylene-ethylene-propylene mixtures, dissolved in a solvent such as acetone or dimethylformamide (DMF).

As liquids, mention can be made in particular of organometallic precursors such as Ga and In precursors, used particularly in electronics, and also nitroglycerine.

In particular, the container of the invention contains acetylene dissolved in DMF or acetone.

The invention is now described in greater detail with reference to the following examples, provided for illustration and not limiting.

EXAMPLES

Example 1

Preparation of Packing Structures of the Invention

1A. Limestone Calcination

A limestone having the following characteristics was used:
Composition (by weight): 97.50% $CaCO_3$, 1.00% $MgCO_3$, 0.8% $SiO_2$, 0.16% $Al_2O_3$, 0.5% $Fe_2O_3$
Particle size distribution: 5 to 10 mm
Porosity: 18.9%
$D_{50}$: 0.93 µm.

About 40 kg of this limestone was spread on four hearths each supporting 10 kg of this product, in a thickness of 3 cm, and calcined in an electric furnace under dry air atmosphere, regulated at a temperature rise rate of 5° C./min to 900° C. and maintained for 5 h at this temperature. Ventilation was activated during the temperature rise and the hold time, and then cut off on cooling, which was unforced.

1B. Slurry Preparation

The quicklime obtained in step 1A was slaked with hot water (43° C.), then mixed in water with various additives, to obtain the slurry having the composition given in Table 1 below.

TABLE 1

| Slurry Composition | |
| --- | --- |
| Component | Quantity |
| CaO | 172 g |
| Water at 43° C. | 800 g |
| Water at 20° C. | 458 g |
| Phosphoric acid | 4 g |
| Poly(oxyethylene) | 0.018 g |
| Micron-scale silica | 180 g |
| Glass fibres | 24.6 g |

1C. Hydrothermal Synthesis and Drying

The slurry obtained in step 1B was injected into unpressurized steel cylinders having a water capacity of 5.8 liters, a total height of 485 mm, an outside diameter of 140 mm and an inside diameter of 136 mm, while ensuring that any bubbles in the slurry were removed from the containers during and after filling. The cylinders were placed under low vacuum during filling. Once filled, the cylinders were closed using valves whereof the opening was tared at 1.4 MPa, and then placed in a furnace where they were heated to a temperature set point and for a period indicated in Table 2 below, under an average pressure of 14 bar (1.4 Mpa) throughout the duration of the hydrothermal synthesis.

The cylinders were then dried in a second furnace after having removed the plugs and valves, at a temperature set point and during a period indicated in Table 2 below, at atmospheric pressure.

TABLE 2

Conditions of Synthesis and Drying of Packing Structures of the Invention

| | Hydrothermal synthesis | | Drying | |
|---|---|---|---|---|
| Cylinder | Temperature (° C.) | Time (h) | Temperature (° C.) | Time (h) |
| A | 196 | 50 | 370 | 100 |
| B | 180 | 50 | 370 | 100 |
| C | 196 | 50 | 370 | 75 |
| D | 190 | 50 | 360 | 80 |

It was confirmed that the packed cylinders thus obtained met the usual standard and regulatory and safety requirements, according to commonly practised approval tests (porosity to acetone, high temperature test and flashback test according to standard ISO 3901-1:2000, inflammability according to standard ISO 3807-1).

Example 2

Structural Characteristics of the Packing Structures of the Invention

The cylinders produced in Example 1 were cut diametrally. No crack or split is observed in the packing structures they contained.

These packing structures were analysed by X-ray diffraction.

These structures were observed to have the chemical composition given in Table 3 below:

TABLE 3

Chemical Composition of Packing Structures of the Invention

| Cylinder | $CaCO_3$ | $SiO_2$ | Tobermorite | Xonotlite |
|---|---|---|---|---|
| A | 3-4% | 0-1% | 3-4% | 92-93% |
| B | 0-3% | 1-2% | 5-10% | 88-90% |
| C | — | — | 10-20% | >80% |
| D | 0-5% | — | 30-40% | >55% |

The packing structures fabricated according to the method described in Example 1 therefore all have the expected chemical composition.

Example 3

Mechanical Strength Test

The packing structures obtained in Example 2 were subjected to a compressive strength test. For this purpose, a 100×100 mm² cube was taken from each packing structure and a force applied to the upper face thereof while it was held against a horizontal metal plate. The force corresponding to the pressure (in kg/cm² or MPa) above which the material began to crack was recorded. This value, which is given in Table 4 below, corresponds to the compressive strength of the material.

TABLE 4

Mechanical Strength Test

| Cylinder | Mechanical Strength (kg/cm²) |
|---|---|
| A | 26 |
| B | 21 |
| C | 27 |
| D | 24 |

It appears from this table that the mechanical strength of the packing structures of the invention conforms to the requisite durability and safety requirements.

Example 4

Withdrawal Test

The cylinders fabricated as described in Example 1 were filled with acetone and then acetylene with a fill factor of 0.524, that is, 0.888 kg of gas in total (including the quantity of saturation gas in the solvent, plus the quantity of useful gas) and 1.694 kg of solvent.

Flow tests were then carried out, withdrawing the gas and regulating it at a continuous flow rate of 400 l/h at an ambient temperature of 20° C. The percentage of gas recovered compared to the initial quantity of gas stored in the cylinder was measured. The results are given in Table 5 below.

TABLE 5

Gas Withdrawal Test

| Cylinder | Degree of gas recovery |
|---|---|
| A | 45% |
| B | 32% |
| C | 46% |
| D | 48% |

As it appears from Table 5, the cylinders of the invention had degrees of gas recovery enabling them to be considered for prolonged use (generally for at least 40 minutes, at full capacity of the cylinder, and at an outside temperature of 18° C.), at a flow rate of 400 liters per hour.

Furthermore, no solvent popping was observed.

Example 5

Comparative Example

Three cylinders were prepared having a water volume of 5.8 liters as described in Example 1, except for the hydrothermal synthesis and drying conditions, which were those indicated in Table 6 below. The chemical composition of the packing structures contained in the said cylinders is also given in Table 6.

TABLE 6

Fabrication Conditions and Chemical Composition
of Comparative Packing Structures

| Cylinder | Hydrothermal synthesis Temp. (°C.) | Time (h) | Drying Temp. (°C.) | Time (h) | Chemical composition CaCO$_3$ | SiO$_2$ | Tobermorite | Xonotlite |
|---|---|---|---|---|---|---|---|---|
| E | 160 | 50 | 350 | 100 | 1-2% | — | 1-2% | 96-97% |
| F | 196 | 50 | 650 | 100 | — | — | — | >99% |
| G | 196 | 50 | 370 | 30 | 1-2% | 1-2% | 50-60%* | <35% |

*including other unidentified crystalline phases

These cylinders were subjected to the tests described in Examples 2 to 4. The results of these tests are given in Table 7 below:

TABLE 7

Comparative Tests

| Cylinder | Mechanical strength (kg/cm$^2$) | Safety performance | Degree of gas recovery |
|---|---|---|---|
| E | 25 | Satisfactory | 15% |
| F | 17 | Unsatisfactory | Not measured |
| G | 12 | Unsatisfactory | Not measured |

It appears from this table that the packing structures not conforming to the invention, since they contain either less than 3% of tobermorite, or less than 55% or more than 97% of xonotlite, failed to meet the requisite safety requirements and/or desired withdrawal performance and/or did not have sufficient mechanical strength (higher than or equal to 15 kg/cm$^2$).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A container packing structure, said container packing structure comprising a crystalline phase containing from 55 to 97% by weight of xonotlite crystallites, from 3 to 45% by weight of tobermorite crystallites, and one or more intermediate phases based on Ca, Si, O and H and of the formula Ca$_x$Si$_y$O$_z$.wH$_2$O in a proportion of up to 15% by weight, said packing structure comprising at least 90% by weight of crystalline phase.

2. The packing structure of claim 1, wherein the intermediate phases are selected from calcium carbonate, silica and foshagite.

3. The packing structure of claim 1, wherein it further contains fibres of carbon and/or of glass and/or of cellulose.

* * * * *